US012002316B1

(12) United States Patent
Gerace et al.

(10) Patent No.: US 12,002,316 B1
(45) Date of Patent: *Jun. 4, 2024

(54) PAPERLESS VENUE ENTRY AND LOCATION-BASED SERVICES

(71) Applicant: Flash Seats, LLC, Los Angeles, CA (US)

(72) Inventors: Samuel Gerace, Novelty, OH (US); Michael Rojas, North Canton, OH (US); Matthew Servant, Frisco, TX (US)

(73) Assignee: Flash Seats, LLC, Los Angeles, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/060,516

(22) Filed: Nov. 30, 2022

Related U.S. Application Data

(63) Continuation of application No. 17/141,946, filed on Jan. 5, 2021, now Pat. No. 11,521,449, which is a
(Continued)

(51) Int. Cl.
*G06Q 10/02* (2012.01)
*G06Q 20/32* (2012.01)
(Continued)

(52) U.S. Cl.
CPC .............. *G07C 9/27* (2020.01); *G06Q 10/02* (2013.01); *G06Q 20/3278* (2013.01); *G07C 9/28* (2020.01);
(Continued)

(58) Field of Classification Search
CPC ..................................................... G06Q 10/02
See application file for complete search history.

(56) References Cited

U.S. PATENT DOCUMENTS

| 3,622,995 A | 11/1971 | Dikes et al. |
| 5,999,095 A | 12/1999 | Earl et al. |

(Continued)

FOREIGN PATENT DOCUMENTS

| CN | 101025806 A | 8/2007 |
| CN | 101299286 A | 11/2008 |

(Continued)

OTHER PUBLICATIONS

Karaiskos et al., "User Acceptance of Pervasive Information Systems: Evaluating an RFID Ticketing System", ECIS 2007 Proceedings. 4, retrieved from https://aisel.aisnet.org/cgi/viewcontent.cgi?article=1192&context=ecis2007 (Year: 2007).*

(Continued)

*Primary Examiner* — Rupangini Singh
*Assistant Examiner* — Bryan J Kirk
(74) *Attorney, Agent, or Firm* — Knobbe, Martens, Olson & Bear LLP

(57) ABSTRACT

When attending an event at a venue, the attendee typically presents ticket information that is scanned by a venue scanner. In conventional systems, once validated, the scanner prints a paper stub that typically includes seat location data. Production of this paper stub can be dispensed with, and the associated data conveyed by the paper stub as well as additional information not contemplated or possible with paper stubs can be conveyed by an electronic stub or e-stub that resides on a device of the attendee, generally the same device employed to present the ticket information.

20 Claims, 13 Drawing Sheets

Related U.S. Application Data continuation of application No. 14/272,170, filed on May 7, 2014, now Pat. No. 10,891,562.

(60) Provisional application No. 61/926,147, filed on Jan. 10, 2014.

(51) Int. Cl.

| | |
|---|---|
| *G07B 11/00* | (2006.01) |
| *G07B 15/00* | (2011.01) |
| *G07C 9/27* | (2020.01) |
| *G07C 9/28* | (2020.01) |
| *H04W 4/80* | (2018.01) |
| *G07C 9/00* | (2020.01) |

(52) U.S. Cl.
CPC ............ *H04W 4/80* (2018.02); *G07B 11/00* (2013.01); *G07B 15/00* (2013.01); *G07C 2009/00769* (2013.01)

(56) References Cited

U.S. PATENT DOCUMENTS

| | | | |
|---|---|---|---|
| 6,496,809 B1 | 12/2002 | Nakfoor | |
| 6,685,093 B2 | 2/2004 | Challa et al. | |
| 6,842,741 B1 | 1/2005 | Fujimura | |
| 6,854,651 B2 | 2/2005 | Smith et al. | |
| 7,146,645 B1 | 12/2006 | Hellstein et al. | |
| 7,454,361 B1 | 11/2008 | Halavais | |
| 7,693,744 B2 | 4/2010 | Forbes | |
| 8,346,580 B2 | 1/2013 | Nakfoor | |
| 8,676,615 B2 | 3/2014 | Callaghan | |
| 8,775,807 B1 | 7/2014 | Vazquez | |
| 9,070,231 B1 | 6/2015 | Meyers | |
| 9,147,191 B2 | 9/2015 | Cohen et al. | |
| 9,153,082 B2 | 10/2015 | Martinez | |
| 9,197,313 B2 | 11/2015 | Delpuch | |
| 9,600,946 B1 | 3/2017 | Gerace et al. | |
| 9,697,650 B2 | 7/2017 | Nakfoor | |
| 9,876,788 B1 | 1/2018 | Ziraknejad | |
| 9,898,880 B2 | 2/2018 | Nagisetty | |
| 10,109,125 B1 | 10/2018 | Gerace et al. | |
| 10,163,105 B1 | 12/2018 | Ziraknejad | |
| 10,867,460 B1 | 12/2020 | Miller | |
| 11,200,306 B1 | 12/2021 | Singh | |
| 11,611,552 B2 | 3/2023 | Backlund | |
| 2001/0051915 A1 | 12/2001 | Ueno et al. | |
| 2002/0169876 A1 | 11/2002 | Curie | |
| 2003/0047613 A1 | 3/2003 | Funamoto et al. | |
| 2003/0105964 A1 | 6/2003 | Brainard | |
| 2003/0110239 A1 | 6/2003 | Sugumoto et al. | |
| 2003/0164400 A1 | 9/2003 | Boyd | |
| 2003/0171960 A1 | 9/2003 | Skinner | |
| 2003/0182242 A1 | 9/2003 | Scott et al. | |
| 2003/0229790 A1 | 12/2003 | Russell | |
| 2004/0006497 A1 | 1/2004 | Nestor et al. | |
| 2004/0035925 A1 | 2/2004 | Wu et al. | |
| 2005/0021364 A1 | 1/2005 | Nakfoor | |
| 2005/0105734 A1 | 5/2005 | Buer | |
| 2006/0089919 A1 | 4/2006 | Kidd | |
| 2006/0101507 A1 | 5/2006 | Camenisch | |
| 2007/0226055 A1 | 9/2007 | Belanger | |
| 2008/0015983 A1 | 1/2008 | Spikes | |
| 2009/0171682 A1 | 7/2009 | Dixon et al. | |
| 2009/0179736 A1 | 7/2009 | Shiraishi | |
| 2009/0188983 A1 | 7/2009 | Walker | |
| 2009/0198617 A1 | 8/2009 | Soghoian et al. | |
| 2009/0294539 A1 | 12/2009 | Kim | |
| 2009/0328207 A1 | 12/2009 | Patel | |
| 2010/0023553 A1 | 1/2010 | Gausman | |
| 2010/0082491 A1 | 4/2010 | Rosenblatt | |
| 2010/0198626 A1 | 8/2010 | Cho | |
| 2011/0105154 A1 | 5/2011 | Kim | |
| 2011/0117966 A1 | 5/2011 | Coppinger | |
| 2011/0119743 A1 | 5/2011 | Gleim et al. | |
| 2011/0208418 A1 | 8/2011 | Looney et al. | |
| 2011/0251862 A1 | 10/2011 | Deluca | |
| 2011/0281652 A1 | 11/2011 | Laverdiere | |
| 2011/0282725 A1* | 11/2011 | Chatterjee | G06Q 30/0238 235/375 |
| 2012/0091202 A1 | 4/2012 | Cohen | |
| 2012/0185695 A1 | 7/2012 | Shah et al. | |
| 2012/0197797 A1 | 8/2012 | Grigg et al. | |
| 2012/0214515 A1* | 8/2012 | Davis | H04W 4/024 455/456.6 |
| 2012/0323691 A1 | 12/2012 | McLaughlin | |
| 2013/0024218 A1 | 1/2013 | Fink | |
| 2013/0085834 A1 | 4/2013 | Witherspoon, Jr. | |
| 2013/0090939 A1 | 4/2013 | Robinson | |
| 2013/0096961 A1 | 4/2013 | Owens | |
| 2013/0185816 A1 | 7/2013 | Maeda | |
| 2013/0262163 A1 | 10/2013 | Bergdale | |
| 2013/0304521 A1 | 11/2013 | Aird | |
| 2013/0325523 A1 | 12/2013 | Huang | |
| 2014/0039945 A1* | 2/2014 | Coady | G06Q 10/02 705/5 |
| 2014/0049373 A1 | 2/2014 | Troy | |
| 2014/0100896 A1 | 4/2014 | Du et al. | |
| 2014/0164029 A1 | 6/2014 | Kwak | |
| 2014/0172707 A1 | 6/2014 | Kuntagod | |
| 2014/0240350 A1 | 8/2014 | Chen | |
| 2014/0240469 A1* | 8/2014 | Lee | G01C 11/14 348/48 |
| 2014/0258530 A1 | 9/2014 | Potterat | |
| 2015/0004935 A1 | 1/2015 | Fu | |
| 2015/0088420 A1 | 3/2015 | Foster | |
| 2015/0142483 A1 | 5/2015 | Bergdale | |
| 2015/0172920 A1 | 6/2015 | Ben Ayed | |
| 2015/0317466 A1 | 11/2015 | Kumar | |
| 2015/0347829 A1 | 12/2015 | Carbonell | |
| 2017/0329777 A1 | 11/2017 | Vlugt | |
| 2017/0358148 A1 | 12/2017 | Kayhani | |
| 2018/0060648 A1 | 3/2018 | Yoo | |
| 2020/0090143 A1 | 3/2020 | Lervolino | |
| 2020/0143022 A1 | 5/2020 | Frost | |
| 2020/0209917 A1 | 7/2020 | Zhou | |
| 2020/0294173 A1 | 9/2020 | Shah | |
| 2020/0320576 A1 | 10/2020 | Harrison | |
| 2020/0380229 A1 | 12/2020 | Peruch | |
| 2021/0090082 A1 | 3/2021 | Cohen | |
| 2021/0174373 A1 | 6/2021 | Nakagawa | |
| 2021/0216893 A1 | 7/2021 | Roden | |
| 2021/0233193 A1 | 7/2021 | Blackburn | |
| 2021/0357893 A1 | 11/2021 | Kang | |
| 2022/0014526 A1 | 1/2022 | Burgess | |
| 2022/0079439 A1 | 3/2022 | Heislop | |

FOREIGN PATENT DOCUMENTS

| | | |
|---|---|---|
| CN | 103415858 B | 3/2018 |
| DE | 100 34 275 A1 | 1/2002 |
| EP | 1831839 | 9/2007 |
| JP | 2001-256513 A | 9/2001 |
| JP | 2001-319186 A | 11/2001 |
| JP | 2002-109343 A | 4/2002 |
| JP | 2002-123730 A | 4/2002 |
| JP | 2002-344444 A | 11/2002 |
| JP | 2004-295650 A | 10/2004 |
| KR | 10-2003-0022630 A | 3/2003 |
| KR | 10-2004-0021165 A | 3/2004 |
| KR | 10-0592411 B1 | 6/2006 |
| WO | WO 94/10658 | 5/1994 |
| WO | WO 2012/096749 A2 | 7/2012 |

OTHER PUBLICATIONS

Balaban, D. (2005). German football charges forward withe-ticketing. Card Technology, 10(10), 18-22. Retrieved from https://dialog.proquest.com/professional/docview/198546689?accountid=131444 (Year: 2005).

Canadian Preliminary Review regarding Canadian Application No. 2577118, dated Jan. 25, 2019, 12 pages.

(56) References Cited

OTHER PUBLICATIONS

Final Office Action for U.S. Appl. No. 15/434,631, dated Jan. 18, 2018, 40 pages.
International Preliminary Report on Patentability and Written Opinion of the International Searching Authority for PCT/US2011/064807, "Mobile Application Bar Code Identification and System", dated Jul. 26, 2013, 5 pages.
Notification of Transmittal of The International Search Report and The Written Opinion of the International Searching Authority, or the Declaration for International Application No. PCT/US2011/064807, dated Jul. 24, 2012, 7 pages.
Office Action for U.S. Appl. No. 14/281,483, dated Jun. 7, 2016, 26 pages.
Office Action for U.S. Appl. No. 15/434,631 dated Jun. 13, 2017, 44 pages.
Supplementary European Search Report for EP Application No. 11855858.4; dated Mar. 29, 2017; Flash Seats, LLC; 9 pages.

\* cited by examiner

EXAMPLE GUIDANCE PRESENTATION

622 — The entrance nearest your seat is the southwest ramp that is marked with an arrow. Since we recommend you enter here, we also recommend that you park in LOT 3 GC or LOT 4 GC.

EXAMPLE GUIDANCE PRESENTATION

632 —

Follow the arrows to your destination

PAPERLESS VENUE ENTRY AND LOCATION-BASED SERVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This disclosure generally relates to providing true paperless entry to a venue and paperless location-based services.

Description of the Related Art

The trend to go paperless has touched most domains, including venue ticketing. Conventional approaches to go paperless generally only further that end up to the point of arriving at the gate. For example, other so-called paperless approaches typically leverage the existence of an attendee-operated smart phone or other computing device, by storing ticket information on the device. With this information digitally encoded, a guest services representative at a door or gate of the venue might simply scan a visual representation of suitable ticket information (e.g., a barcode) as readily as scanning the same or similar information from a paper ticket. In what is referred to herein as "flash seat" embodiments, a similar process might occur. That is, the device can include ID information in addition to or instead of ticket/barcode information, which can be scanned at the gate. In either case, assuming access to a suitable device, the attendee can arrive at the gate without any paper, thereby furthering the ends of going paperless.

However, conventional paperless entry approaches are not truly paperless. In particular, once the attendee has produced sufficient proof of rights to enter (e.g., ticket data based on old approaches or ID data based on the more innovative flash seats approach), the scanner used by the guest services representative to verify this information prints a paper seat locator. This seat locator is then transferred to the attendee and can be subsequently produced for ushers in the interior of the venue to aid in seat location or verify entry privileges to certain exclusive portions of the venue.

SUMMARY OF THE INVENTION

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to paperless venue entry. Verification data representing verification of a privilege to enter a venue can be received. Such can be received in response to a challenge of entry to the venue executed by a venue device associated with the venue. Locator data representing a location associated with the privilege to enter the venue can be received in response to the verification. The locator data can be presented to a user interface associated with the device of the attendee.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION OF THE PREFERRED EMBODIMENT

Overview

Figure 1:
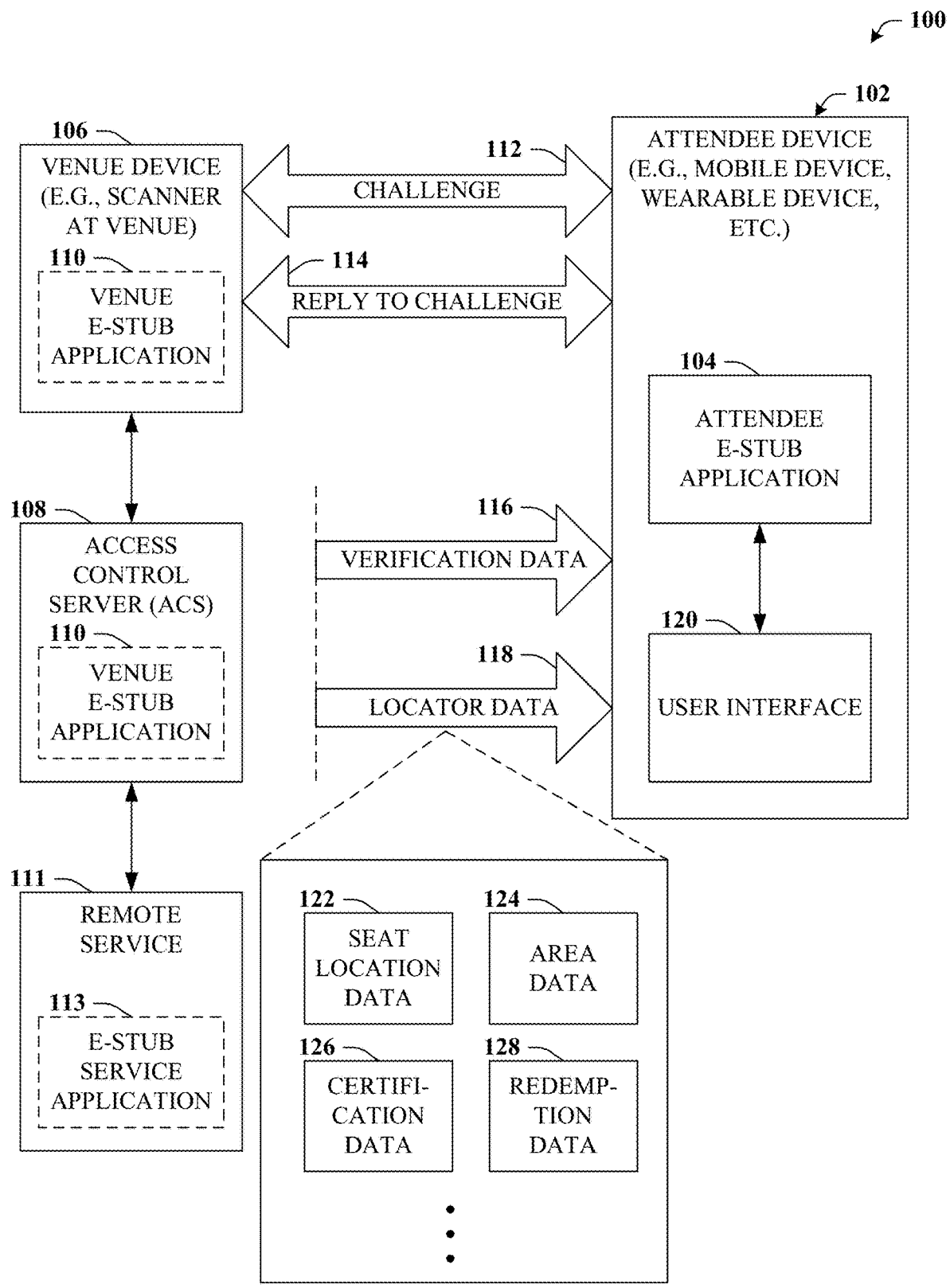
FIG. 1 illustrates a block diagram of an example system that can provide for paperless venue entry in accordance with certain embodiments of this disclosure.

The subject matter described broadly relates to various techniques or mechanisms that can be utilized in connection with events (e.g., live events) held at a venue (e.g., stadium, arena, amphitheatre, theme park, etc.). These techniques or mechanisms can be ticketing-oriented, seating-oriented, or the like; and can be directed to enhancing efficiency, available features, conservation, incentives, security, or the experiences associated with event attendees (e.g., a ticket purchaser), event performers (e.g., artists, athletes, etc.), event hosts (e.g., venue owners, operators, etc.), event vendors or sponsors, or other suitable parties.

When venues hold an event, manifests representing a seat map are used. Applying a manifest to a particular event can yield a ticket inventory, which can be a set of individual tickets. The process of creating and selling or otherwise allocating these tickets to customers is known as primary ticketing. Traditionally, primary ticketing relied on a paper ticket that was printed on-site and retrieved (e.g., from a will call booth) prior to entering the event, or in some cases delivered to the customer. Later, ticket outlets took over certain aspects of the ticket logistics, by delivering or providing convenient locations to pick-up the paper ticket. Soon after, customers were able to purchase tickets and print the ticket or a barcode at home. Eventually, this process has begun to migrate toward so-called "paperless" tickets, particularly in cases where the customer (e.g., event attendee) has access to a suitable electronic device of some sort to store the ticket information.

However, regardless of whether the attendee appears at the venue with a paper ticket or an electronic one, the procedure for entering is somewhat similar. In particular, guest services representative(s) are assigned to each point of ingress at the venue, equipped with a scanner of some type. The scanner is used to scan the ticket or printed barcode (whether paper or electronic) and appropriate information is sent from the scanner to an access control server (ACS). The ACS can respond to this query with indications that the ticket or barcode is valid and has not already been scanned.

Recently, an alternative model, denoted herein as "flash seats," was introduced, which associated a ticket or other contractual right to enter an event or venue with a user account. This association with a user account has led to numerous advantages in connection with the domain and is, in some implementations, assumed in connection with concepts or embodiments disclosed herein. As one example advantage, because of the association with a user account, entry to the venue can be gained by producing at the gate an ID of some type rather than a barcode or ticket. Therefore, as used herein the term "ticket" is intended to refer to data relating to a privilege to enter, including conventional ticket data as well as ID-based data such as that utilized by flash seats embodiments. The ID can be a conventional driver license, passport, credit card, but can also relate to data stored on a user device such as a visual image, voice signatures or other signatures, an audio-based signal or watermark, device ID, individual ID, biometric data such as a fingerprint, retina, or DNA, etc. The device that stores such data (referred to herein as an "attendee device") can be any suitable device such as a smart phone, tablet, wearable device, or the like.

As previously noted, conventional paperless entry approaches are not truly paperless. In particular, once the attendee has produced sufficient proof of rights to enter (e.g., ticket bar code data based on old approaches or ID data based on the more innovative flash seats approach), the scanner used by the guest services representative to verify this information prints a paper seat locator. This seat locator is then transferred to the attendee and can be subsequently produced for ushers in the interior of the venue to aid in seat location or verify entry privileges to certain exclusive portions of the venue.

This paper seat locator provided to the attendee upon entry to the venue is, of course, paper, and therefore counter to the stated goal of going paperless. Therefore, in accordance with embodiments of this disclosure, this paper seat locator can be replaced with an electronic locator, denoted an "e-stub." An application executing on the attendee's device, in addition to presenting data sufficient to gain entry, can subsequently receive and present any data associated with the paper seat locator as well. Thus, the e-stub represents a significant advantage in the quest to go paperless, which is considered to have a positive environmental impact and can provide for reduced costs in terms of supplies and janitorial services. Furthermore, given e-stub data is integrated with a computing device, such can be leveraged to provide numerous additional advantages not possible with paper stubs.

It is to be appreciated that the innovation is not limited to simply seat location but can be applied to locating any suitable venue, item, or even person. For example, the locator can facilitate guiding a client to a restaurant, rest room, VIP lounge, security desk, first aid, information desk, a friend's seat, etc. Location and routing technologies such as wireless triangulation, access points, mesh networks, proximity sensors, GPS (where applicable) can be employed in connection with the various routing embodiments. Additionally, a client can be routed to an item of interest (e.g., a particular type of shirt sold at one or more locations), and even routed to a preferable parking location or back to a vehicle after the event. Guidance can be accomplished based on identifying the attendee's current location and destination, and applying these two data points to a map of the venue or other appropriate area. Attendee's current location can be determined based on communication with beacons situated at various points in the venue or with remote systems. Beacons can use RFID, NFC, Bluetooth, or any suitable wireless technology, and can utilize techniques associated with triangulation or any suitable location-based technology. Additionally or alternatively, beacons can be based on transmission/reception of an audio signal, such as, e.g., one that is beyond the range of human hearing. Audio-based beacons can be advantageous because these beacons can be employed to determine a current location without the need for sophisticated and/or expensive equipment such as GPS. Rather, a microphone (and/or a speaker in some embodiments), which is typically standard on a much wider set of devices than GPS, might be used to determine location. Another advantage of audio-based beacons is that such an implementation does not rely on a wireless network. Wireless networks typically exhibit extremely degraded performance when many thousands of users are in a small area, such as is generally the case for venues hosting an event. Destination data can be identified in a similar manner (e.g., when the destination is another person with a suitable device), or might be at a known or predefined location.

Example Systems for Paperless Venue Entry and Location Based Services

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Referring now to FIG. 1, a system 100 is depicted. System 100 can, inter alia, provide for paperless venue entry, which can be employed in connection with existing barcode approaches or with flash seat ID approaches. In either case, an attendee acquires (e.g., purchases) a ticket to an event held at a venue, and associated information is stored on an attendee device 102 such as a mobile phone or wearable device. Attendee device 102 can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and other figures disclosed herein. As depicted, attendee device 102 can also include attendee e-stub application 104 that can be included in a non-transitory computer readable medium of attendee device 102 and that, when executed, can facilitate many of the functions detailed herein.

Upon arrival at a venue, potential attendees are typically met at the gate or other point of ingress by a guest services representative equipped with a scanner of some type, illustrated here as venue device 106. With this scanner (e.g., venue device 106), the guest services representative will typically scan the tickets of incoming attendees. The venue device can be in communication with an access control server (ACS) 108 that can verify that the information scanned relates to a valid ticket and that the ticket has not already been redeemed. In other so-called paperless embodiments, venue device 106 will typically scan a digital representation of the ticket that is presented by a user device and, if validated by ACS 108, print a seat locator stub that is then given to the attendee. However, as detailed herein, this paper seat locator stub can be replaced such as with an e-stub, which can be effectuated by a temporary communication session established between attendee e-stub application 104 and venue e-stub application 110 and/or e-stub service application 113.

This communication session can be effectuated by the scanning process. For example, attendee e-stub application 104 can present, in addition to or alternatively to other ticket information, information associated with a device ID or address information that can be read by venue device 106. Upon scanning this information, an associated venue e-stub application 110 can interpret this data and the communication session can be established. It is understood that venue e-stub application 110 can represent a venue-based counterpart to attendee e-stub application 104 that can perform venue-side functions detailed herein. Depending on the embodiment, venue e-stub application 110 can be executing on venue device 106, ACS 108, or both. Therefore, it is further understood that the communication session can be established between the attendee device 102 and the venue device 106 in some embodiments but between the attendee device 102 and ACS 108 in other embodiments.

In some embodiments, communication can be established between attendee device 102 and e-stub service application 113 that can be part of a remote service 113. For example,
ACS 108 can forward ID information (e.g., scanned by venue device 106) to remote service 111. Remote service 111 can associate the ID information to an account associated with the attendee and identify ticket information associated with that attendee.

Regardless of the particular implementation, once communication is established, attendee device 102 can be presented with a challenge 112. Challenge 112 can relate to a query as to whether attendee device 102 has a privilege to enter the venue, to which attendee device 102 can provide reply 114 to challenge back to venue e-stub application 110. Reply 114 can include a credential of some sort, which can be the ticket information (e.g., a particular barcode received in response to the ticket purchase, an ID associated with the ticket purchaser, etc.)

Venue e-stub application 110, whether executing on venue device 106 or ACS 108, can examine reply 114 and determine whether the credential is sufficient to establish the privilege to enter the venue (which can be accomplished in connection with remote service 111) and can then facilitate transmission of verification data 116 and locator data 118 to attendee device 102. Verification data 116 can represent verification that attendee device 102 (or, by proxy, the associated attendee or device owner) has a privilege to enter the venue. Locator data 118 can represent a location associated with the privilege to enter the venue. For example, locator data 118 can be or can include seat location data 122 representing a seat or other location within the venue that is linked to the attendee's ticket purchase. An illustration of such is provided in connection with FIG. 2A. As another example, locator data 118 can be or can include area data 124 representing a defined area, usually exclusive to some extent, within the venue such as, e.g., a club level, VIP lounge and so on. An example of such is provided in connection with FIG. 2B. Locator data 118 can include certification data 126 or redemption data 128, which are further detailed in connection with FIGS. 3A-4.

Figure 2A:
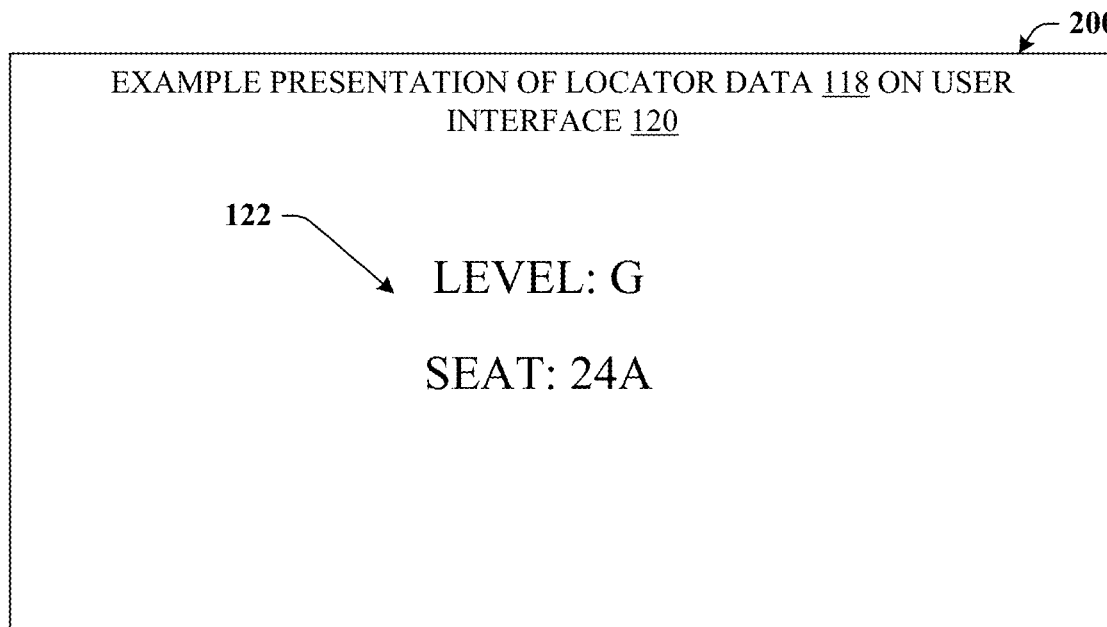
FIG. 2A provides a block diagram illustration that depicts an example presentation of the seat location data in accordance with certain embodiments of this disclosure.
Figure 2B:
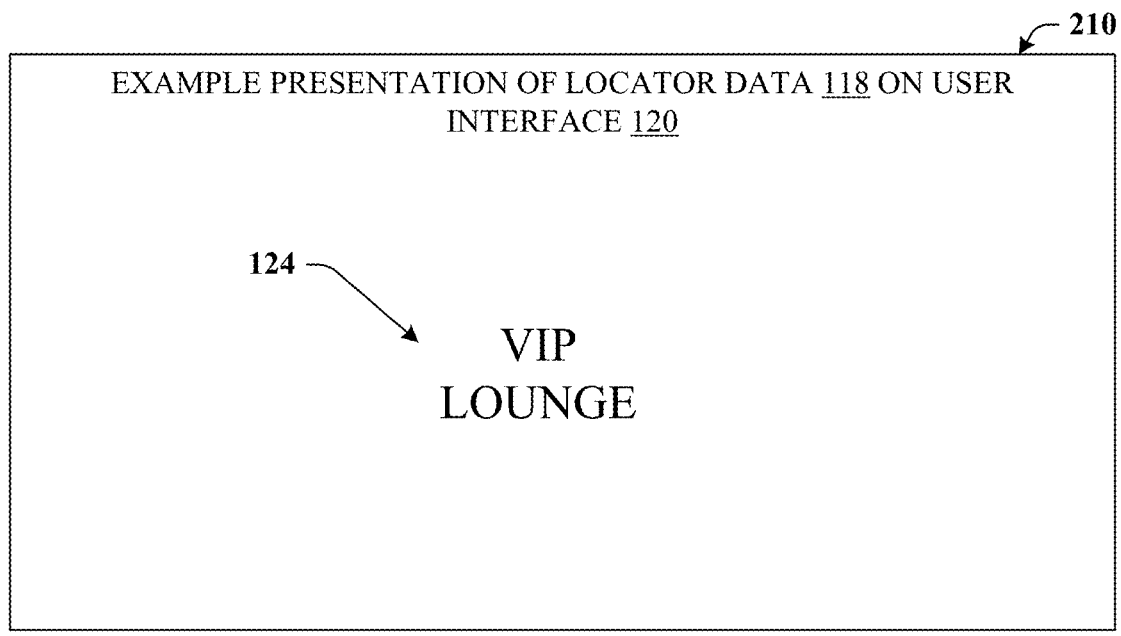
FIG. 2B provides a block diagram illustration that depicts an example presentation of the area data in accordance with certain embodiments of this disclosure.

Referring now to FIGS. 2A-B, illustrations 200 and 210 are provided. Illustration 200 depicts an example presentation of the seat location data 122. Illustration 210 depicts an example presentation of area data 124. As noted, locator data 118 can be presented to a user interface 120 of attendee device 102. Put another way, after a guest services representative scans ticket information included on attendee device 102, instead of receiving a paper stub, attendee device 102 can electronically display whatever information might have been on the paper stub, as well as providing numerous other aspects.

As with paper stubs, once inside the venue, ushers or security might request the attendee produce the stub, either for guidance or access verification. Thus, the e-stub presented on attendee device 102 can be produced instead of a paper stub. Moreover, unlike conventional paper stubs, the e-stub can be updated which can open up numerous opportunities. For example, at the gate, presentation 200 might be displayed to indicate to the guest services representative scanning tickets that the attendee has a valid ticket. However, once inside the venue, and upon nearing a particular area (e.g., the VIP Lounge), then interface 120 can switch to presentation 210, to indicate to internal ushers that the attendee has access to the VIP lounge. Any location for which the attendee is authorized to visit or has access to can be displayed, even e.g., "restroom" such that internal ushers can provide directions and/or be on notice that the attendee has access or authorization to the area or location displayed by interface 120 of attendee device 102. Interface 120 can be updated based on location as well, such as at places in the venue where there are known checkpoints or the like.

Figure 3A:
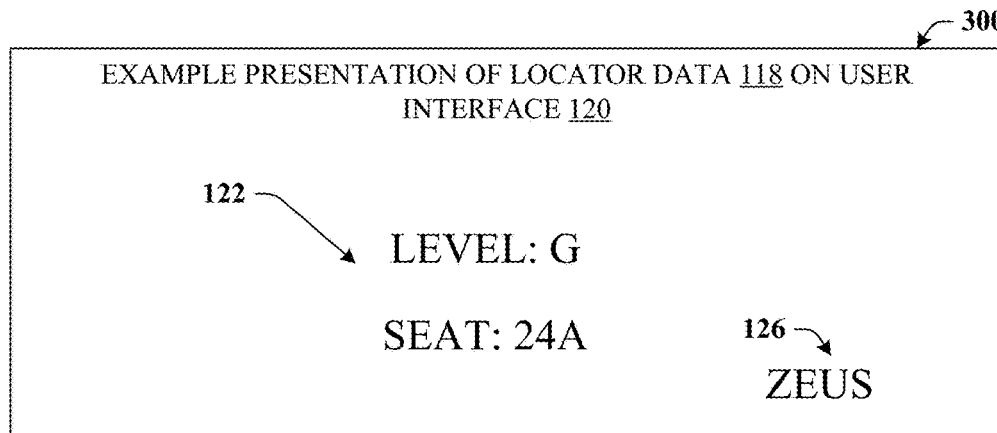
FIGS. 3A-C illustrate various block diagram illustrations that depict several example presentations of the locator data that includes certification data in accordance with certain embodiments of this disclosure.
Figure 3B:
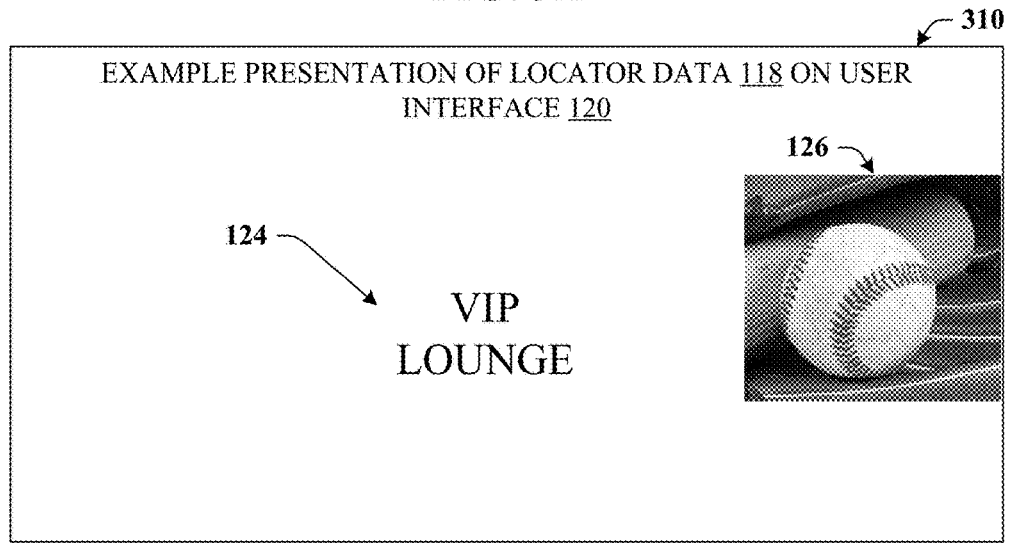
Figure 3C:
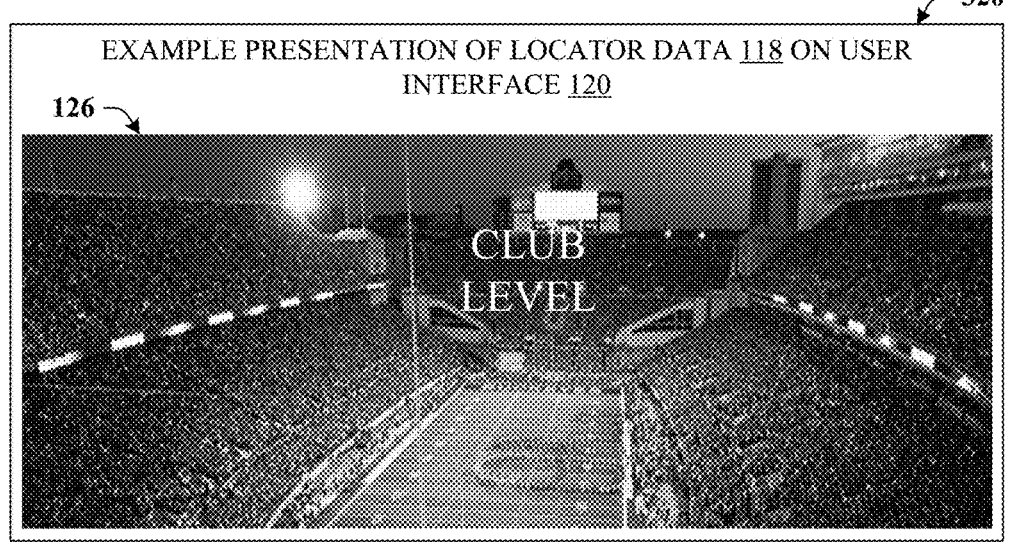

Turning now to FIGS. 3A-C, illustrations 300, 310, and 320 are provided. Illustrations 300, 310, and 320 relate to various example presentations of the locator data 118 that includes certification data 126 and/or indicia associated with certification data 126. Certification data 126 can relate to a certification that the locator data 118 is authentic. As one example, certification data 126 might be a word or phrase (e.g., code of the day). Presentation 300 depicts the word "Zeus" as certification data 126. Hence, when a venue representative is presented attendee device 102 that includes other locator data 118 such as seat location data 122, seeing the word Zeus also displayed can represent that the other locator data 118 is authentic. Presentation 310 provides an example in which certification data 126 is an image, whereas presentation 320 provides an example in which certification data 126 is a background image. The above are intended to be non-limiting examples, and it is understood that certification data 126 can take many other forms and can be substantially any suitable indicia. For instance, certification data 126 might be a watermark, an audio presentation of some type or even a machine-readable code or string, which might utilize encryption aspects. It is understood that attendee e-stub application 104 can take measures to secure certification data 126. For instance, the image of the bat and baseball in presentation 310 or the stadium image of presentation 320 might be presentable to interface 120, but not otherwise accessible by applications other than attendee e-stub application 104.

Figure 4:
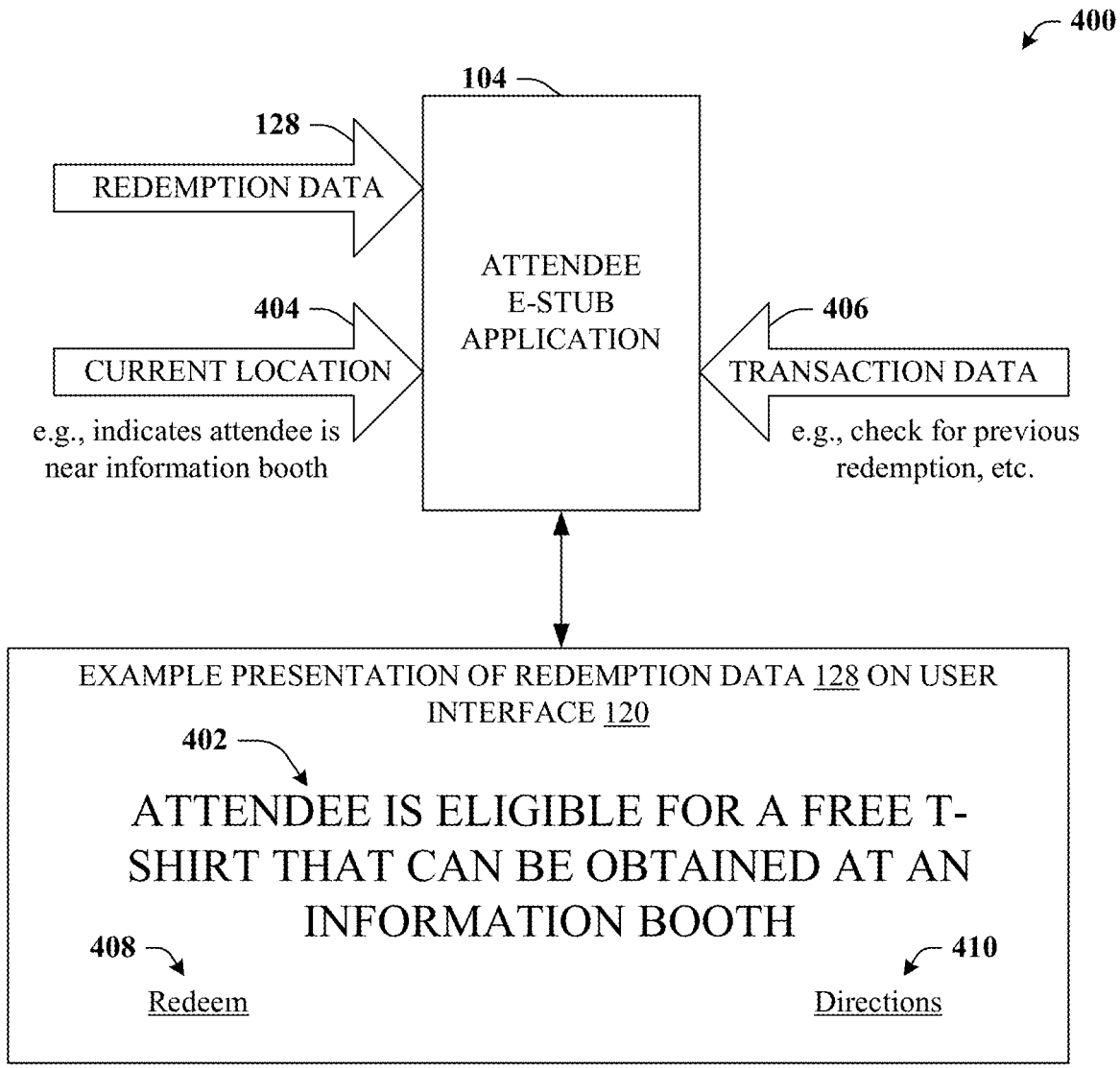
FIG. 4 illustrates a block diagram of a system that can provide for the locator data including redemption data and an example presentation of the redemption data in accordance with certain embodiments of this disclosure.

Referring now to FIG. 4, system 400 is depicted. System 400 can provide for the locator data 118 including redemption data 128. Redemption data 128 can represent a value redeemable for a good or service associated with the venue. For instance, many venues provide incentives to attract attendees. Conventionally, one might present the paper stub to receive a free or discounted item. The paper stub is typically then stamped or annotated in some way to prevent re-use. In accordance with the disclosed subject matter in which the paper stub is no longer necessary and can be replaced by an e-stub, which can facilitate the same or similar transactions as the paper stub. In this case, the e-stub can facilitate the transaction via redemption data 128.

Consider the case in which the venue is offering a free T-shirt to some subset of venue attendees. Attendee device 102 can actually inform or remind the attendee of this incentive, an example of which is illustrated at 402. In some embodiments, display 402 can be prompted based on a particular trigger that might be location-based, time-base, or based on some other criteria. For instance, attendee e-stub application 104 might receive current location data 404, which indicates attendee device 102 is very near to an information booth handing out these free t-shirts. Current location data 404 might be determined via beacon techniques, triangulation techniques, or any other suitable location-based technique. The trigger might also be based on other transaction data 406 such as, e.g., whether attendee device 102 has already redeemed this particular incentive. When the attendee arrives at the information booth, rather than presenting a paper stub, a redemption element 408 can be selected, which can provide the information desired by the information booth prior to distributing the free t-shirt. Selecting element 408 can lead to a menu or confirmation steps, and ultimately might only be capable of completion a single time or a defined number of times. A representative at the information booth can readily verify that redemption element 408 has been selected (e.g., based on information displayed thereafter) and then provide the free t-shirt. In some embodiments, the attendee might desire directions to the information booth where the free t-shirts are distributed. Such can be facilitated by selecting element 410, which is further detailed in connection with FIG. 5.

Figure 5:
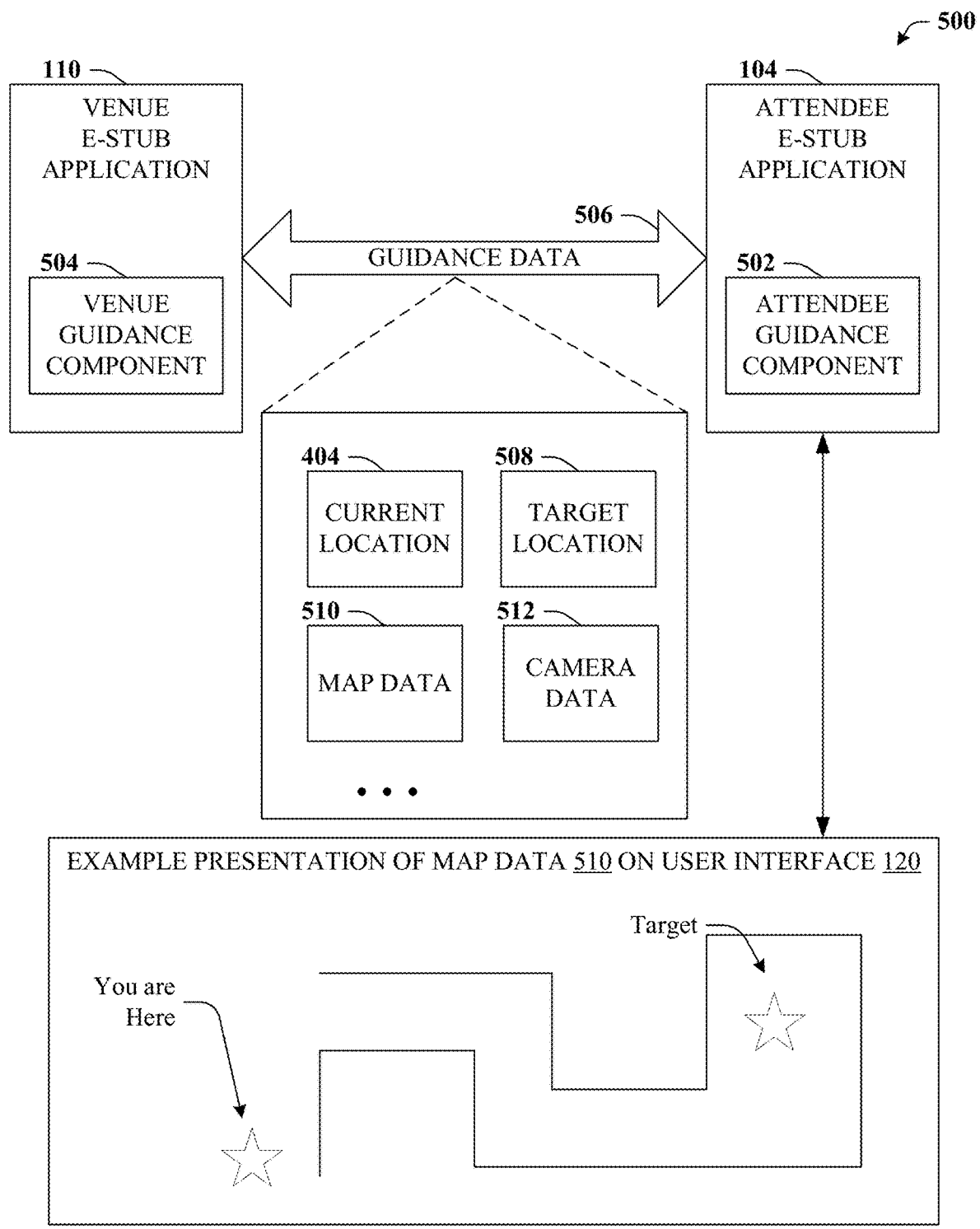
FIG. 5 illustrates a block diagram of a system, with example map presentation, that can provide for guiding a venue attendee to a target location in accordance with certain embodiments of this disclosure.

Referring now to FIG. 5, system 500 is illustrated. System 500 can provide for guiding a venue attendee to a target location. Guiding the attendee can be accomplished by one or both attendee guidance component 502 (e.g., executing in conjunction with attendee e-stub application 104 at attendee device 102) or venue guidance component 504 (e.g., executing in conjunction with venue e-stub application 110), and can be based on guidance data 506. Portions of guidance data 506 can be transmitted to or received from guidance components 502, 504, which can take place at the initial communication session established at the gate or based on other communication sessions.

Guidance data 506 can include current location data 404 that can represent a current location of attendee device. The current location can be determined in a variety of ways such as, e.g., wireless triangulation, utilization of access points, mesh networks, proximity sensors, or GPS. Guidance data 506 can also include target location data 508. Target location data 508 can represent a target location, e.g., where the attendee wants to go, which might be determined or specified. Guidance data 506 can further include map data 510 that can represent a map of all or a portion of the venue. As illustrated, map data 510 can be presented on user interface 120 and visual indicia can be provided that accentuates one or both the attendee's current location or the target location identified by data 508.

In some embodiments, the presentation of map data 510 can be based on an orthogonal representation (e.g., aerial or top-down view) as provided in this example. In some embodiments, the presentation of map data 510 can be based on a heads-up display (HUD) representation. The HUD representation can employ camera data 512. As an example, consider the case in which the attendee wants to locate his or her seat. Such might be depicted as an orthogonal map with a star or other indicia placed at the target location. In HUD representation embodiments, interface 120 can present live video footage being captured by attendee device 102, but augment this display by, e.g., highlighting the location of the seat. Hence, as the attendee pans attendee device 102, the highlighted seat can come into view, or the highlighted feature (e.g., a glowing wireframe of the seat) can appear in the view even if the seat is some distance in the direction of the camera, but occluded by a wall or another object.

Figure 6A:
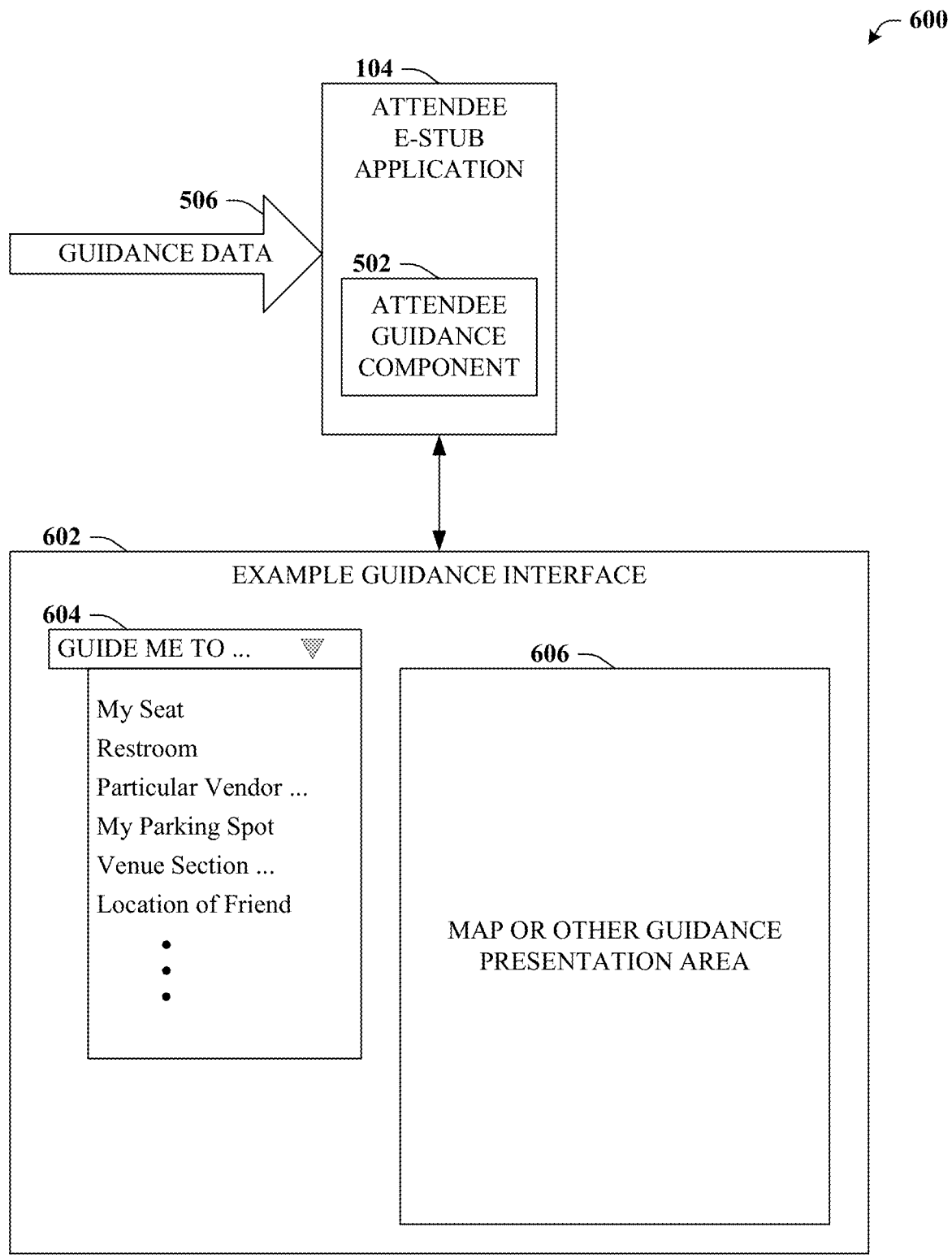
FIG. 6A illustrates a block diagram of a system, with example guidance interface, that can provide for additional features or aspects in connection with guiding a venue attendee to a target location in accordance with certain embodiments of this disclosure.

Referring to FIG. 6A, system 600 is provided. System 600 can provide for additional features or aspects in connection with guiding a venue attendee to a target location. In this example, attendee e-stub application 104 and/or attendee guidance component 502 can receive guidance data 506 and can present a guidance interface, and example of which is depicted at 602. Guidance interface 602 can include selection mechanism 604 in which target location 508 can be selected. In this case, selection mechanism 604 is a drop-down menu, however other menus or mechanisms can be employed. Elements included in the selection mechanism can be populated based on information included in guidance data 506 or from other data sources, and can be specific to a particular venue, a particular event type held at the venue, a particular sponsor, and so on.

In this example, target locations 508 that are selectable can include the attendee's seat, a restroom, potentially the nearest one to current location 404, or a particular vendor, selection of which might bring up another menu to select the type of vendor or good or service desired. Another example can include a location of the attendee's car or a recommendation of where to park upon arrival (e.g., in a lot with ready access to a point of ingress that is near the attendee's seat), which can reference a map of parking real estate associated with or near to the venue. Other examples can include selecting a particular venue section, or with the proper authorization a location of a friend, who is also at the venue. Regardless of the selection, whether one of the listed examples or other suitable examples, a map or other guidance elements can be presented in presentation area 606.

Figure 6B:
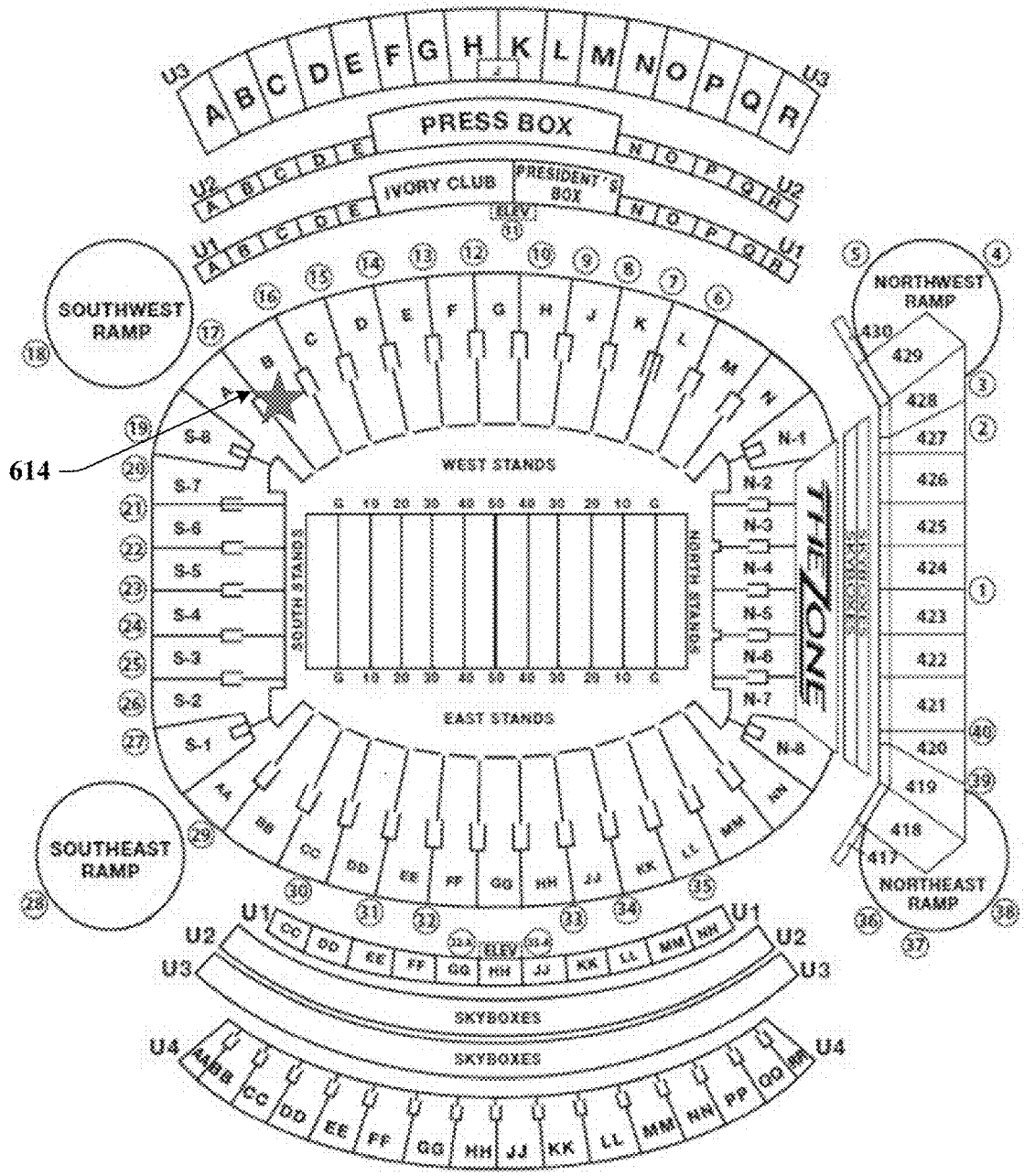
FIGS. 6B-D depict graphical illustration that provide example guidance presentations in accordance with certain embodiments of this disclosure.
Figure 6C:
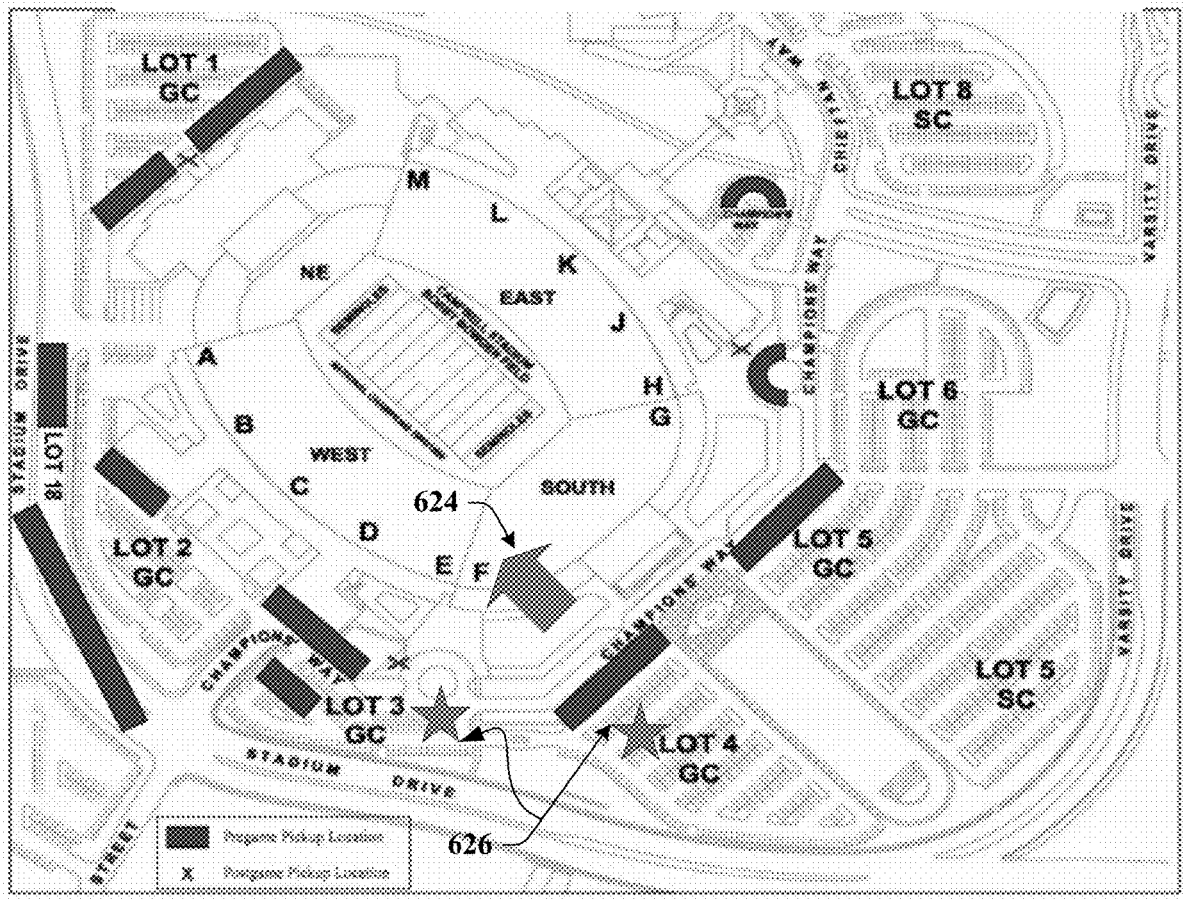
Figure 6D:

Turning now to FIGS. 6B-6D, various illustrations 610, 620, and 630 are respectively presented that provide example guidance presentations. These example guidance presentations can be provided, for example, in guidance presentation area 606 depicted in FIG. 6A upon selection of a particular target location, or in connection with other presentations. Illustration 610 depicts an orthogonal view of a stadium and a message 612 that indicates the attendee's seat is in section B marked with a star. The star is labeled with reference numeral 614. Message 612 also indicates that the nearest entrance to the stadium is via the southwest ramp, which can be useful information for the attendee.

Illustration 620 depicts an orthogonal view of a stadium and nearby parking locations. Illustration 620 can be related to illustration 610 and can include message 622 that indicates the entrance nearest to the attendee's seat is the southwest ramp that is marked with an arrow (labeled here as reference numeral 624). Since it was recommended (here or in connection with illustration 610) that the attendee enter via the southwest ramp, it is further recommended that the attendee park in either lot 3 or lot 4 that are marked with stars (labeled with reference numeral 626). Such example presentations can be beneficial both for parking upon arrival as well as finding one's automobile when departing.

Illustration 630 depicts a first-person view and/or HUD view. The attendee might be capturing video with a camera included in attendee device 102. The video can be augmented in real time to provide directions to the attendee such as to the restroom, a first aid station, a particular vendor and so on. Additionally or alternatively, the target can be highlighted on the view.

Example Methods for Paperless Venue Entry And Location Based Services

Figure 7:
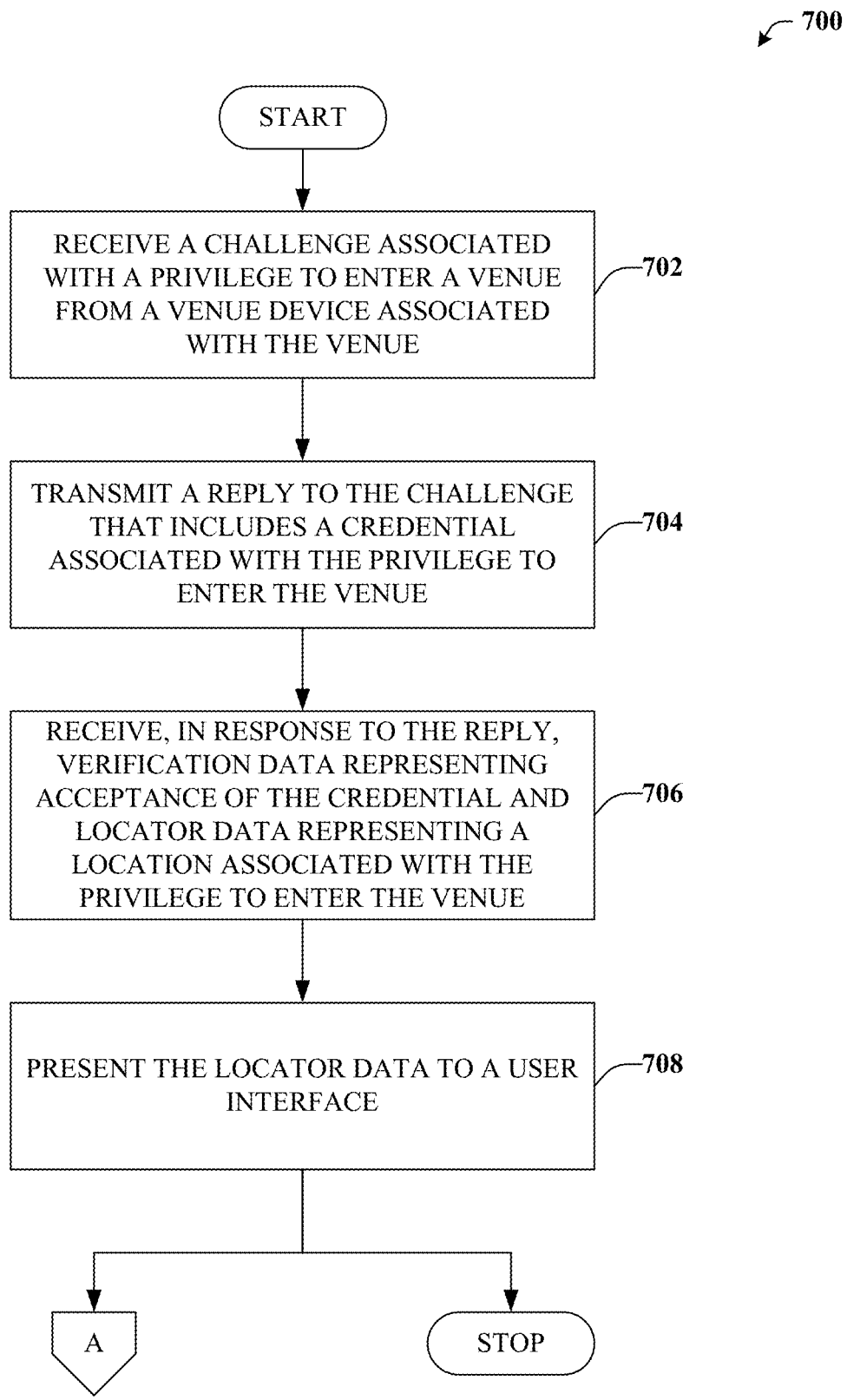
FIG. 7 illustrates an example methodology that can provide for paperless venue entry in accordance with certain embodiments of this disclosure.
Figure 8:
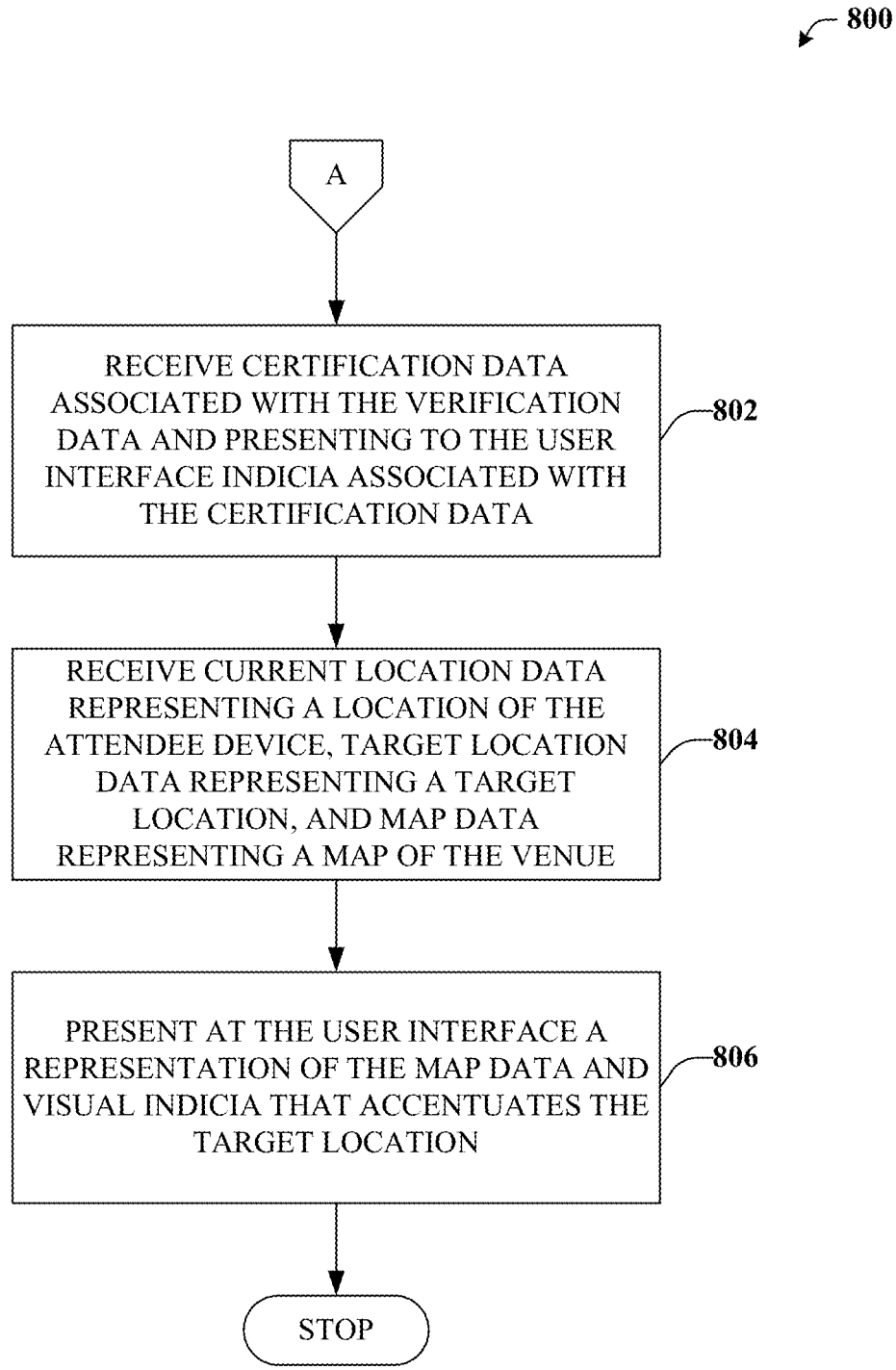
FIG. 8 illustrates an example methodology that can provide for additional features or aspects in connection with providing paperless venue entry in accordance with certain embodiments of this disclosure.

FIGS. 7 and 8 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 7 illustrates exemplary method 700. Method 700 can provide for paperless venue entry. For example, at reference numeral 702, a challenge associated with a privilege to enter a venue can be received. The challenge can be received from a venue device associated with the venue. For example, the venue device can be a scanner device, typically equipped by guest services representatives at points of ingress to the venue. As another example, the venue device can be an access control server (ACS) that is typically in communication with the various scanner devices of guest services representatives.

At reference numeral 704, a reply to the challenge can be transmitted. The reply can include a credential associated with the privilege to enter the venue. For example, the credential might be an identifier associated with the ticket or with an individual that purchased the ticket. In some embodiments, the credential might be or might include an identifier for a particular device (e.g., a mobile device of the attendee), or a particular device-based communication address.

At reference numeral 706, verification data and locator data can be received in response to the reply. For instance if the credential in the reply is determined to be valid, then in response, the verification data and locator data can be received. Verification data can represent an indication that the credential was accepted as valid, and therefore can in some embodiments be implicit (e.g., by the fact that locator data was received, such constitutes verification that the credential was accepted). Locator data can represent a location associated with the privilege to enter the venue. Locator data can relate to a seat location, a defined area of the venue, or another suitable location.

At reference numeral 708, the locator data can be presented to a user interface. Accordingly, the user interface of an attendee's device can be presented to venue personnel in lieu of presenting the old paper stubs. Such data can be persistently displayed or might be triggered by a user (e.g., in response to a request/demand) or by location.

FIG. 8 illustrates exemplary method 800. Method 800 can provide for additional features or aspects in connection with providing paperless venue entry. For instance, at reference numeral 802, certification data can be received. Certification data can be associated with the verification data (e.g., can be data that is provided upon verification that a privilege to enter the venue exists or is authentic). Certification data can be a word or phrase, an image or some other form of data. Indicia associated with the certification data (e.g., the visual presentation of the word or phrase or the image) can be presented to the user interface. Hence, a venue employee presented with a seat location can see the seat location as well as the indicia associated with the certification data and is therefore assured the seat location data is authentic.

At reference numeral 804, various data can be received. Among this data can be current location data representing a location of the attendee device. The received data can also include target location data representing a target location (e.g., where the attendee wants to go) and map data representing a map of all or a portion of a venue or related locales (e.g., venue parking)

At reference numeral 806, a representation of the map data can be presented to the user interface. Visual indicia that accentuates the target location can be presented as well. The map data can be presented as an orthogonal-based presentation or a first-person HUD based view.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
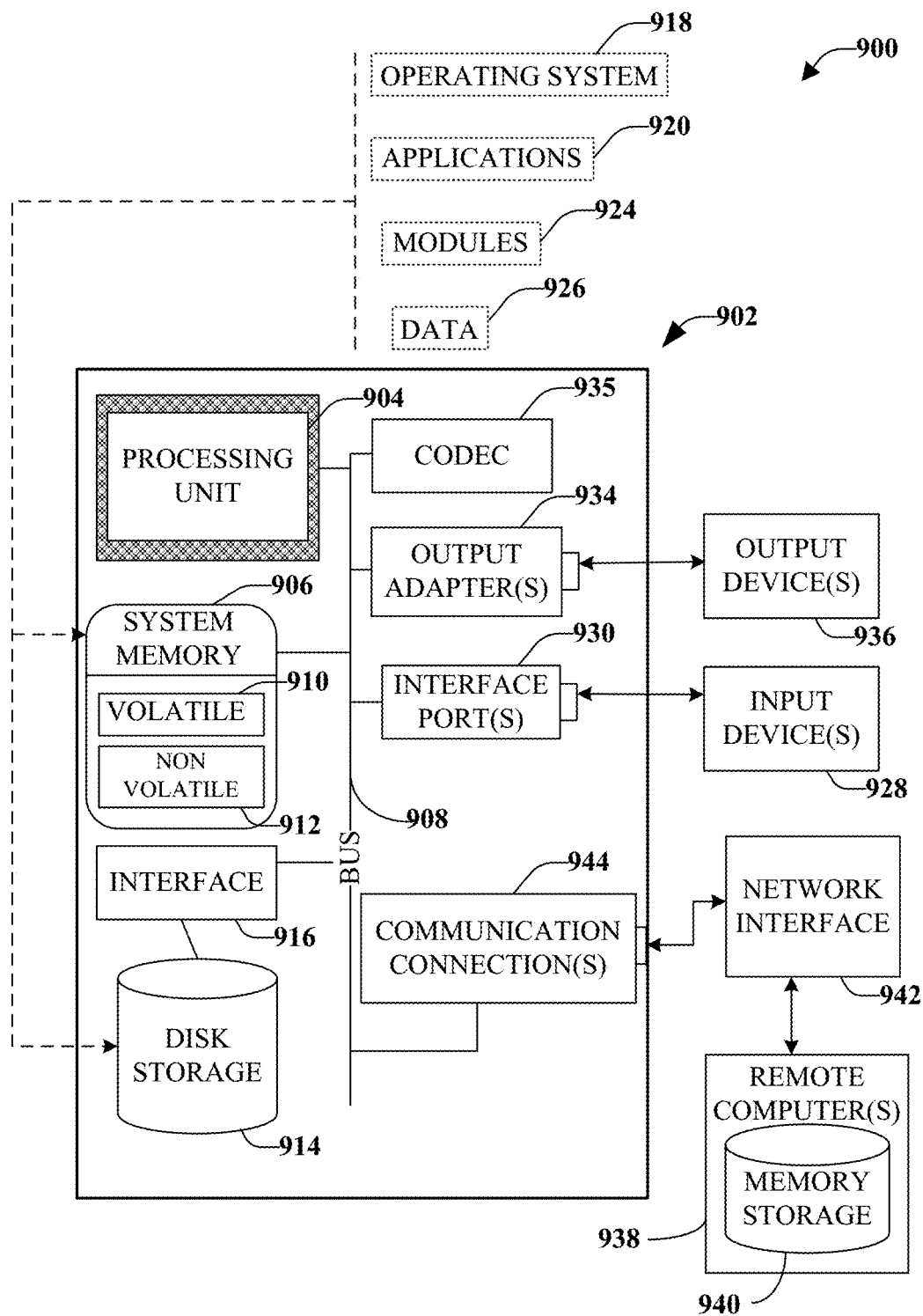
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 906 includes volatile memory 99 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. Although, codec 935 is depicted as a separate component, codec 935 may be contained within non-volatile memory 912 or included in other components detailed herein. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 99 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 902 may also include removable/non-removable, volatile/nonvolatile computer storage medium. FIG. 9 illustrates, for example, disk storage 914. Disk storage 914 includes, but is not limited to, devices like a magnetic disk drive, solid state disk (SSD) floppy disk drive, tape drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to authorize having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
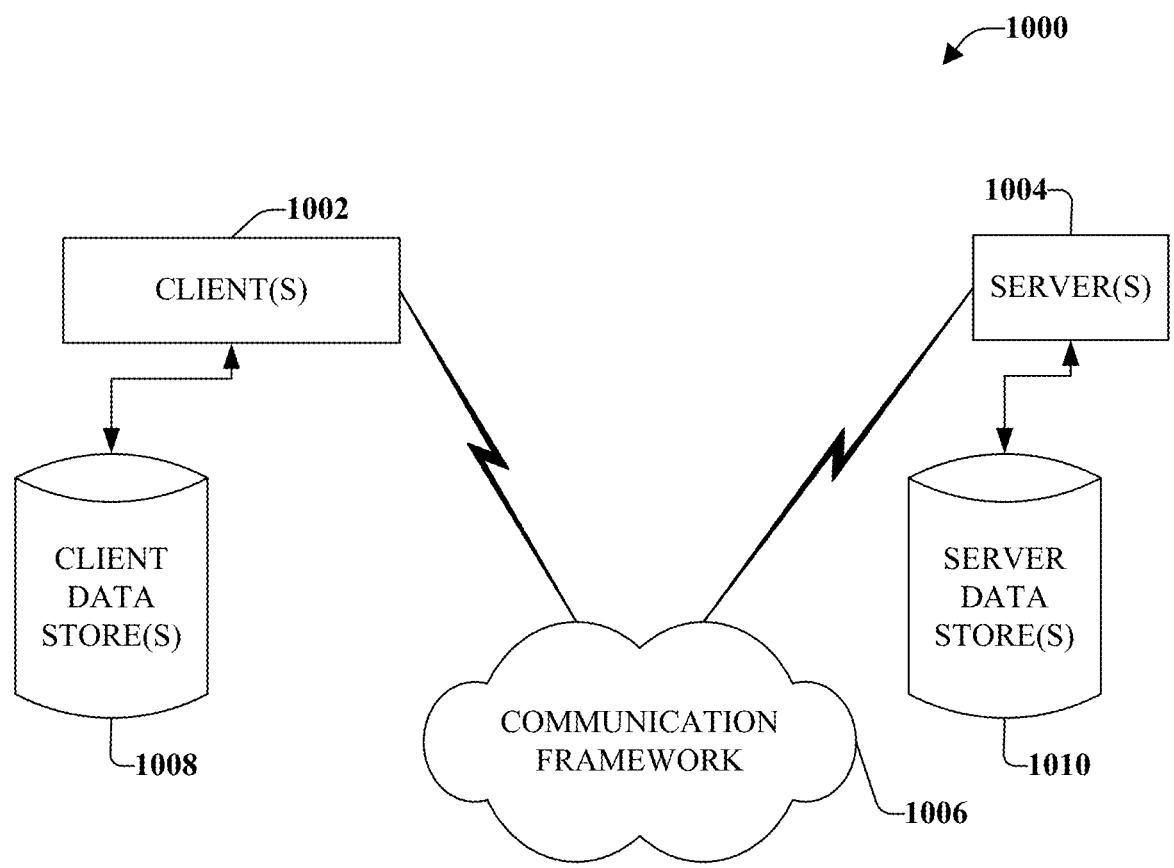
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate subcomponents, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A venue entry and location based services system, comprising:
   a plurality of venue beacon devices configured to emit signals at a venue;
   a computer system;
   non-transitory computer readable storage medium storing computer-executable instructions that, in response to execution by the computer system, cause the venue entry and location based services system to perform operations, comprising:
      transmitting, using a venue device, a challenge communication to a mobile device of a user;
      receiving a challenge response from the mobile device of the user, the challenge response including a credential comprising a device identifier associated with the mobile device of the user;
      using the challenge response received from the user mobile device, including the credential comprising the device identifier, to identify ticket information associated with an account to determine if the mobile device is associated with previously acquired venue access privileges;
      in response to the determining, using the received challenge response that the mobile device is associated with previously acquired venue access privileges, transmitting data comprising redemption data, the transmitted data enabling the user to access the venue by causing a certification code to be displayed by the mobile device, and wherein the transmitted data comprising redemption data enables at least a first item to be redeemed;
      using at least one venue beacon device of the plurality of beacon devices to send a signal to the mobile device or to receive a signal to enable a location of the mobile device to be determined,
      enabling the determined location of the mobile device, determined using the at least one venue beacon, to be used to generate location data, wherein the location data is displayed by the mobile device;
      using a trigger, comprising:
         redemption history data, and
         the mobile device location,
      to determine whether to enable the mobile device to provide information relating to the redemption data; and
      at least partly in response to determining that the mobile device is to be enabled to provide information relating to the redemption data, enabling the mobile device to provide information relating to the redemption data when the mobile device is in proximity to a location at which the redemption data can be used to redeem the first item, the redemption data included in the data transmitted to the mobile device in response to determining, using the challenge response, that the mobile device is associated with venue access privileges;

providing a menu of target locations, the menu populated based at least in part on:
the venue, and
an event being held at the venue;
at least partly in response to a selection of a target location in the menu of target locations, providing a photographic image of at least a portion of the venue, overlaid with a graphical directional symbol.

2. The venue entry and location based services system of claim 1, the operations further comprising causing the mobile device to display venue location information associated with a ticket corresponding to the ticket information after determining that the mobile device is associated with venue access privileges, wherein the venue location information identifies a seat location within the venue.

3. The venue entry and location based services system of claim 1, the operations further comprising using a beacon proximate to a defined area of a venue to cause the mobile device to display a second certification code indicating that the user bearing the mobile device is permitted to access the defined area of the venue, wherein entry to the defined area is permitted in response to an additional privilege that is in addition to the privilege to enter the venue, and wherein entry to the defined area is denied without the additional privilege.

4. The venue entry and location based services system of claim 1, the operations further comprising causing the mobile device to display locator data associated with a ticket corresponding to the ticket information after determining that the mobile device is associated with venue access privileges, wherein the venue comprises interior checkpoints that verify the locator data and the certification code.

5. The venue entry and location based services system of claim 1, the operations further comprising causing the mobile device to display locator data associated with a ticket corresponding to the ticket information after determining that the mobile device is associated with venue access privileges, wherein the locator data further comprises redemption data representing a value redeemable for a good or service associated with the venue.

6. The venue entry and location based services system of claim 1, wherein the operations further comprise enabling target location data representing a target location, and map data representing a map of the venue to be displayed on the mobile device.

7. The venue entry and location based services system of claim 1, the operations further comprising enabling target location data, representing a target location, and map data representing a map of the venue to be displayed on the mobile device, wherein a representation of the map data and visual indicia that accentuates the target location is enabled to be displayed on the mobile device.

8. The venue entry and location based services system of claim 1, wherein the operations further comprise enabling target location data representing a target location and a map of the venue to be displayed on the mobile device wherein the map is an orthogonal representation.

9. The venue entry and location based services system of claim 1, wherein the operations further comprise enabling target location data representing a target location and a map comprising a heads-up display (HUD) representation map data to be displayed on the mobile device, the operations further comprise presenting, on the map comprising a heads-up display (HUD) representation map data, user interface elements that indicate a path to the target location.

10. Non-transitory computer readable storage medium storing computer-executable instructions that, in response to execution by a computer system, cause the computer system to perform operations, comprising:
transmitting, at a venue, a challenge communication to a device of a user;
receiving a challenge response from the device of the user, the challenge response comprising data associated with a ticket;
using the received challenge response from the user device, the challenge response comprising data associated with the ticket, to identify ticket information associated with an account and to determine if the user device is associated with venue access privileges for the venue;
in response to determining, using the received challenge response from the user device, that the user device is associated with venue access privileges, transmitting data comprising redemption data to the user device, the transmitted data enabling the user to access the venue by causing a certification code to be provided by the user device, wherein the redemption data enables a redemption operation to be performed;
determining, using a signal communicated via at least at least one venue beacon device to the user device or received from the user device, a location of the user device within the venue;
using a trigger, comprising:
redemption history data, and
the user device location,
to determine whether to cause related information to be displayed by the user device; and
at least partly in response to determining that information related to the determined user device location is to be displayed by the user device:
enabling the user device to provide information relating to the redemption data, the redemption data included in the data transmitted to the user device, at least partly in response to the user device being in proximity to a location at which the redemption data can be used to redeem an item
providing a menu of target locations, the menu populated based at least in part on:
the venue, and
an event being held at the venue;
at least partly in response to a selection of a target location in the menu of target locations, providing a photographic image of at least a portion of the venue, overlaid with a graphical directional symbol.

11. The non-transitory computer readable storage medium of claim 10, wherein the information related to the determined user location comprises guidance information.

12. The system of claim 10, wherein a certification is configured for presentation at the user device in connection with a presentation of locator data.

13. The system of claim 10, wherein the operations further comprise transmitting map data representing a map of the venue to the user device, the map indicating the user location determined using the signal communicated via at least one venue beacon device.

14. The system of claim 10, wherein the operations further comprise determining guidance data representing navigation, from the user location determined using the signal communicated via at least one venue beacon device, to a target location and transmitting the guidance data to the user device.

15. A computer-implemented method, comprising:
transmitting, at a venue, a challenge communication to a device of a user;

receiving a challenge response from the user device, at a computer system comprising computing devices;

using, by the computer system, the received challenge response from the user device to identify ticket information associated with an account to determine if the user device is associated with venue access privileges with respect to a venue;

transmitting data comprising redemption data to the user device, the transmitted data enabling the user to access the venue by causing a certification code to be provided by the user device, wherein the transmitted data comprises redemption data that enables at least a first item to be redeemed;

determining, using a signal communicated via at least one venue beacon device to the user device or received from the user device, a location of the user device within the venue;

using a trigger, comprising:
redemption history data, and
the user device location,
to determine whether to cause related information to be displayed by the user device; and at least partly in response to determining that information related to the determined user device location is to be displayed by the user device:

enabling the user device to provide information relating to the redemption data, included in the data transmitted to the user device in response to determining, using the challenge response, that the user device is associated with venue access privileges, at least partly in response to the user device being in proximity to a location at which the redemption data can be used to redeem the first item;

providing a menu of target locations, the menu populated based at least in part on:
the venue, and
an event being held at the venue;

at least partly in response to a selection of a target location in the menu of target locations, providing a photographic image of at least a portion of the venue, overlaid with a graphical directional symbol.

16. The method of claim 15, wherein the venue comprises interior checkpoints that verify locator data provided via the user device representing a location associated with the venue access privilege.

17. The method of claim 15, further comprising generating and providing to the user device target location data representing a target location, and map data representing a map of the venue.

18. The method of claim 15, further comprising determining that the redemption data has been used to redeem the first item, and triggering a first prompt to be presented on the user device.

19. The method of claim 15, further comprising:
generating and providing to the user device target location data representing a target location, and map data representing a map of the venue; and causing a representation of the map data and visual indicia that
accentuates the target location to be displayed on the user device.

20. The method of claim 15, further comprising:
generating and providing to the user device target location data representing a target location, and map data representing a map of the venue; and
determining guidance data representing navigation from the location of the user within the venue, determined using the signal communicated via at least the one venue beacon device, of the user device to the target location.

\* \* \* \* \*

UNITED STATES PATENT AND TRADEMARK OFFICE
CERTIFICATE OF CORRECTION

PATENT NO. : 12,002,316 B1
APPLICATION NO. : 18/060516
DATED : June 4, 2024
INVENTOR(S) : Samuel Gerace et al.

It is certified that error appears in the above-identified patent and that said Letters Patent is hereby corrected as shown below:

In the Specification

On Column 10, Line 57: Delete "parking)" and insert -- parking). --.

In the Claims

On Column 18, Lines 22-23: In Claim 10, delete "at least at least" and insert -- at least --.

Signed and Sealed this
Sixth Day of August, 2024

Katherine Kelly Vidal
*Director of the United States Patent and Trademark Office*